United States Patent [19]
Fujimoto et al.

[11] Patent Number: 4,968,335
[45] Date of Patent: Nov. 6, 1990

[54] GAS ABSORPTION TOWER

[75] Inventors: Masaki Fujimoto; Tatsumi Tano, both of Yamaguchi, Japan

[73] Assignee: Ube Industries, Ltd., Yamaguchi, Japan

[21] Appl. No.: 470,629

[22] Filed: Jan. 26, 1990

[30] Foreign Application Priority Data

Feb. 7, 1989 [JP] Japan .................... 1-26710
Dec. 8, 1989 [JP] Japan .................... 1-317705

[51] Int. Cl.⁵ .............................................. B01D 53/18
[52] U.S. Cl. ......................................... 55/223; 55/233; 55/238; 55/260
[58] Field of Search ........................ 55/223, 227–229, 55/233, 237, 238, 259, 260

[56] References Cited

U.S. PATENT DOCUMENTS

| | | | |
|---|---|---|---|
| 3,218,047 | 11/1965 | Calaceto | 55/238 X |
| 3,615,199 | 10/1971 | Terrana et al. | 55/260 X |
| 3,793,809 | 2/1974 | Tomany et al. | 55/223 X |
| 3,856,487 | 12/1974 | Perez | 55/223 |
| 3,925,039 | 12/1975 | Ziegler | 55/238 X |
| 3,971,642 | 7/1976 | Perez | 55/223 |
| 3,989,488 | 11/1976 | Wisting | 55/238 |
| 3,990,870 | 11/1976 | Miczek | 55/238 X |
| 4,312,646 | 1/1982 | Fattinger et al. | 55/223 X |
| 4,424,069 | 1/1984 | Chang | 55/227 X |
| 4,722,745 | 2/1988 | Pike | 55/223 X |

FOREIGN PATENT DOCUMENTS

| | | | |
|---|---|---|---|
| 2740039 | 3/1979 | Fed. Rep. of Germany | 55/223 |
| 885853 | 9/1943 | France | 55/237 |
| 55-092125 | 7/1980 | Japan | 55/238 |
| 60-084130 | 5/1985 | Japan | 55/228 |
| 1290363 | 9/1972 | United Kingdom | 55/233 |

Primary Examiner—Robert Spitzer
Attorney, Agent, or Firm—Kanesaka and Takeuchi

[57] ABSTRACT

A gas absorption tower comprising a primary desulfurization absorption section and a secondary desulfurization section are mounted in lower and higher portions, respectively, of the inside of the tower body. The primary absorption section mounted in the lower portion comprises an inner cylinder disposed substantially in the center of the tower body, a gas passage formed between the inner cylinder and the inner wall surface of the tower body, a gas introduction port opening into the gas passage, a gas inlet port formed in the side wall of the inner cylinder and opening into the cylinder, and a plurality of absorbent-spraying nozzles mounted along the flow of gas in the gas passage extending to the gas inlet port in the inner cylinder. The top of the inner cylinder is in communication with the secondary absorption section. The inner cylinder has a closed lower portion to form a vessel for holding absorbent dropping from the secondary absorption section. The gas inlet port is connected to the gas passage at a certain distance from the gas introduction port along the gas passage.

3 Claims, 6 Drawing Sheets

GAS ABSORPTION TOWER

FIELD OF THE INVENTION

The present invention relates to a gas absorption tower, such as a desulfurization tower, which absorbs or removes a certain component such as sulfur dioxide or sulfur oxides from flue gas (waste gas) from a boiler, for example.

BACKGROUND OF THE INVENTION

A boiler in which coal is burned emits flue gas containing a large amount of sulfur oxides such as $SO_2$. Therefore, it is the common practice to pass the flue gas through a desulfurization tower before the gas is discharged to the atmosphere to remove the sulfur oxides, for preventing public nuisance such as acid rain.

Figure 6:
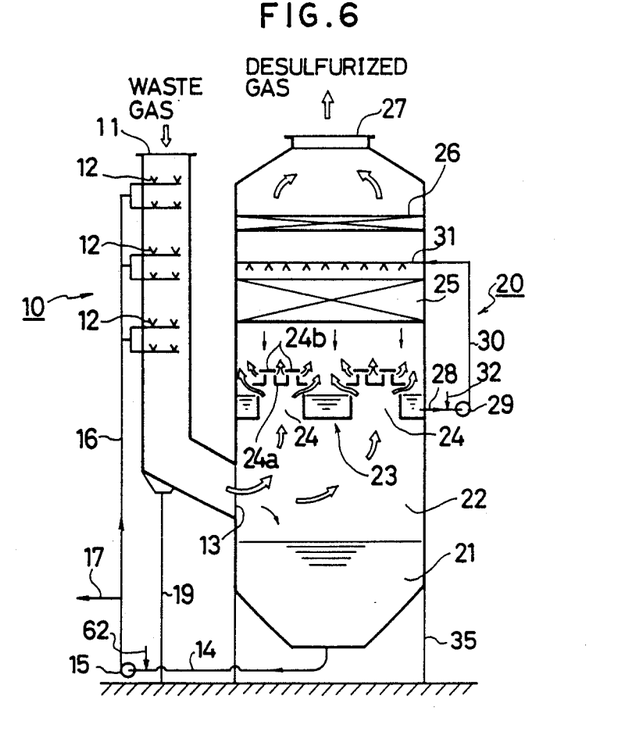
FIG. 6 is a vertical cross section of the prior art desulfurization tower.

A conventional desulfurization tower which acts as a gas absorption tower for removing sulfur oxides is constructed as shown in FIG. 6, where a primary desulfurization tower and a secondary desulfurization tower are indicated by numerals 10 and 20, respectively. Waste gas is first supplied to the primary desulfurization tower 10, where most of the sulfur oxides is removed. The flue(waste) gas is introduced into the secondary desulfurization tower 20, where the remaining sulfur oxides is removed up to a given value.

The primary desulfurization tower 10 is rectangular in cross section and extends vertically. The tower 10 has a flue gas inlet port 11 at its top position and a flue gas exit port 13 at its lowest position. The exit port 13 acts also as an entrance port to the secondary desulfurization tower 20. The exit port 13 opens into the lower portion of the secondary tower 20 and is connected to it. The primary tower 10 is rigidly fixed to foundations by a support leg 19. A number of nozzles 12 for spraying absorbent are mounted inside the primary tower 10 in such a way that they are vertically regularly spaced from each other. The nozzles 12 are disposed opposite to the flow of the waste gas. A vessel 21 for holding-(receiving) the absorbent is mounted at the bottom of the secondary tower 20. A pipe 16 extends from the vessel 21 to the nozzles 12 via a pipe 14 and a pump 15. A make-up liquid supply pipe 62 is disposed in the pipe 14 on the suction side of the pump 15. A discharge pipe 17 discharges a part of used absorbent (absorbing liquid) to waste water treatment equipment (not shown).

The secondary desulfurization tower 20 is circular in cross section and extends vertically. The lower portion of the tower 20 is rigidly fixed to foundations by a support leg 35. The aforementioned vessel 21 for receiving the absorbing liquid is mounted at the bottom of the secondary tower 20 below the flue gas exit port 13 of the primary tower 10. A vapor-liquid separation chamber 22 is formed above the vessel 21 and faces the opening of the flue gas exit port 13 of the primary tower 10. Vessels 23 are mounted above the chamber 22 to receive absorbent dropping from a secondary desulfurization section located at a higher position. A plurality of chimneys 24 which open at their lower ends into the chamber 22 extend through each vessel 23. Umbrellas 24a are mounted above each chimney 24 so as to form gas discharge ports. Each umbrella 24a is equipped with smaller chimneys 24b which are similar in structure to the chimneys 24. A packed bed 25 composed of resin particle materials which brings gas into contact with the absorbent is mounted above the vessels 23. A multiplicity of nozzles 31 are mounted above the packed bed 25 to spray the absorbent. An eliminator 26 for removing mist such as liquid droplets entrained by gas is mounted above the nozzles 31. A discharge port 27 for discharging desulfurized gas is formed at the top of the tower 20. A pipe 30 extends from the vessels 23 to the nozzles 31 via a pipe 28 and a pump 29. A make-up liquid supply pipe 32 is connected to the pipe 28 on the suction side of the pump 29.

The operation of the desulfurization tower constructed as described thus far is now described. Flue gas from a boiler is at a temperature of 140° C. to 150° C. and contains 1000 ppm of $SO_2$, for example. The flue gas is supplied into the primary desulfurization tower 10 from the waste gas supply port 11 of the tower 10. The gas makes contact with a counterflow of an absorbing liquid sprayed from the nozzles 12 while traveling downward. Thus, most of the sulfur oxides such as $SO_2$ contained in the waste gas is removed. At this time, dust such as fly ashes contained in the flue gas is also removed, and the flue gas is cooled. When the flue gas treated in this way leaves the flue gas exit port 13 of the primary desulfurization tower 10, the temperature is approximately 60° C., and the concentration of $SO_2$ is about 150 ppm, for example. After the flue gas undergoes the primary desulfurization, it is introduced into the vapor-liquid separation chamber 22 in the secondary desulfurization tower 20 from the flue gas exit port 13. In this chamber, liquid is separated from gas. The liquid is held in the lowermost vessel 21. The gas, or waste gas, flows upward through the tower 20, passes through the chimneys 24, the smaller chimneys 24b, and are uniformly distributed over the cross section of the tower 20. Then, the gas is admitted into the packed bed 25 located at a higher position. Inside the packed bed 25, the absorbing liquid sprayed from the nozzles 31 makes a uniform contact with the flue gas. As a result, $SO_2$ of the gas is removed up to about 40 ppm, for example. The absorbing liquid which was passed through the bed 25 enters the vessels 23 and stays in them. The liquid is sent back to the nozzles 31 via the pipes 28 and 30 by the pump 29, so that the liquid is reused. The absorbing liquid overflows from the vessels 23 and falls into the lower vessel 21 of the primary desulfurization section. After $SO_2$ of the flue gas is removed up to a given value by the filler 25, the gas is passed through the eliminator 26 to remove mist. Subsequently, the gas is discharged from the port 27.

The absorbing liquid which is used to remove $SO_2$ (sulfur dioxide) can be a mixture of $MgSO_3$ (magnesium sulfite), $Mg(HSO_3)_2$ (magnesium hydrogensulfite), $MgSO_4$ (magnesium sulfate), and $H_2O$ (water). $SO_2$ is absorbed chiefly by $MgSO_3$. $Mg(OH)_2$ (magnesium hydroxide) is supplied to the mixture water solution. As an example, a mixture water solution having a concentration of 5% and a pH of 5.2 is employed in the primary desulfurization tower 10. A mixture water solution having a concentration of 1% and a pH of 5.9 to 6.2 is used in the secondary desulfurization tower 20.

In order to secure certain desulfurization performance, the flow rate of the gas treated in the desulfurization sections, especially in the primary desulfurization section, must be kept at a certain value. In the above-described conventional desulfurization equipment, the primary and secondary desulfurization towers are mounted separately and so the whole equipment is large. Especially, where a large flow rate of waste gas, e.g., 350,000 $Nm^3$/hr., is treated, the cross section of the primary desulfurization tower 10 measures 2 m by 4 m. The inside diameter of the secondary desulfurization tower 20 is as long as 8 m. Thus, both primary and secondary desulfurization towers which are large in this way are needed. Where a large amount of flue gas is treated, large and complex equipment is necessary. Also, large space is required to install it. This frequently imposes limitations on the installation. The secondary desulfurization tower 20 necessitates the absorbing liquid-holding vessel 23 equipped with the chimneys 24. This complicates the structure and increases the cost.

SUMMARY OF THE INVENTION

It is an object of the present invention to provide a small-sized absorption tower which is free of the foregoing drawbacks, does not require large space to install, and can be installed easily.

It is another object of the invention to provide a gas absorption tower which can secure a certain flow rate of gas needed to absorb certain components of a gas to assure the absorption.

In a gas absorption tower according to the invention, a primary desulfurization absorption section and a secondary desulfurization section are mounted in lower and higher portions, respectively, of the inside of the tower body. The primary absorption section mounted in the lower portion comprises an inner cylinder disposed substantially in the center of the tower body, a gas passage formed between the inner cylinder and the inner wall surface of the tower body, a gas introduction port opening into the gas passage, a gas inlet port formed in the side wall of the inner cylinder and opening into the cylinder, and a plurality of absorbent spraying nozzles mounted along the flow of gas in the gas passage extending to the gas inlet port of the inner cylinder. The top of the inner cylinder is in communication with the secondary absorption section. The inner cylinder has a closed lower portion to form a vessel for holding absorbent dropping from the secondary absorption section. The gas inlet port is connected to the gas passage at a certain distance from the gas introduction port along the gas passage.

In this structure, a gas, such as flue gas from a boiler, which contains certain components such as sulfur oxides is introduced from the gas introduction port in the primary absorption section in the lower portion of the tower body. The gas passes through the gas passage formed between the inner cylinder and the inner wall surface of the tower body. In the gas passage, the gas is brought into contact with absorbent sprayed from the nozzles mounted along the flow of gas. The gas is cooled, dust is removed, and a certain percentage of the certain components such as sulfur oxides is absorbed, i.e., the gas is desulfurized. Because the gas passage can have a sufficient volume, and because a certain flow rate of gas is assured, primary absorption takes place certainly. After the certain percentage of the certain components is removed, the gas enters the gas inlet port that is formed in the side wall of the inner cylinder at a certain distance from the gas introduction port. Then, the gas goes out of the top of the inner cylinder and is admitted into the secondary absorption section located above the cylinder. In this secondary section, the gas undergoes final absorption. After the certain constituents are absorbed in the secondary absorption section, the absorbent drops into the vessel mounted at the bottom of the inside of the inner cylinder.

In the novel gas absorption tower, the primary absorption section is mounted at a position corresponding to the position where the vapor-liquid separation chamber 22 of the conventional absorption tower (desulfurization tower) is located. For this reason, the whole equipment is simple in structure. The chimneys 24 of the conventional absorption tower are not required to be mounted. Also, the absorbing liquid-receiving vessels 23 needing a certain height are dispensed with. Therefore, the height of the equipment can be reduced, and the equipment can be made small. Further, the single tower alone can treat a large amount of waste gas, say 350,000 $Nm^3/hr.$, as described above.

DESCRIPTION OF THE PREFERRED EMBODIMENTS

Figure 1:
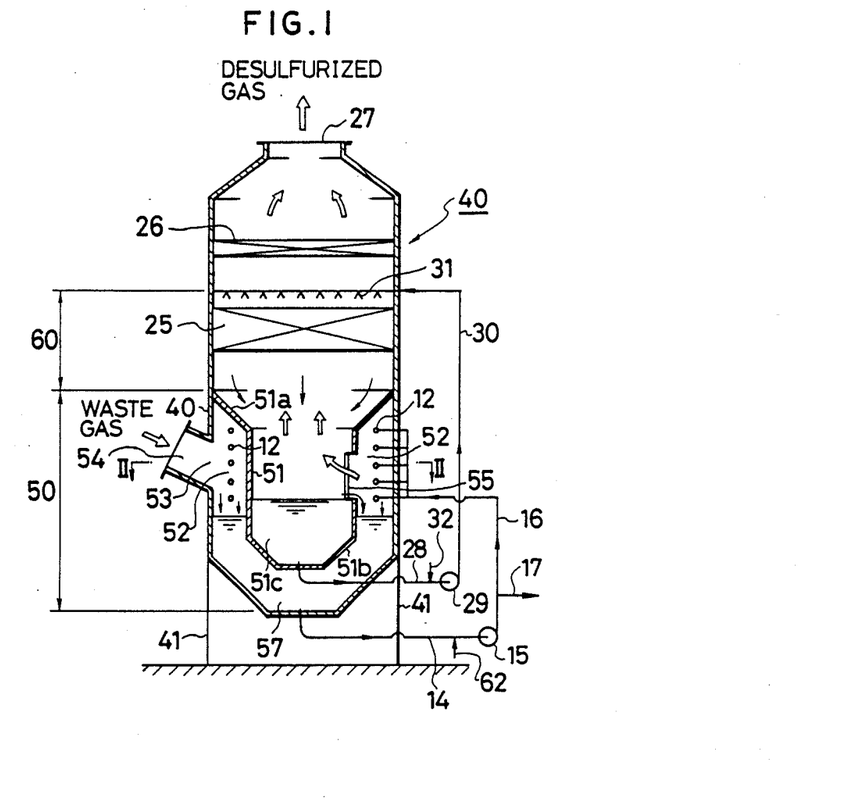
FIG. 1 is a vertical cross section of a desulfurization tower according to the invention.
Figure 2:
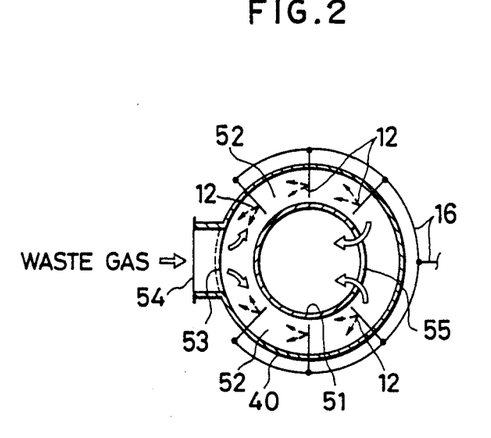
FIG. 2 is a cross-sectional view taken along line II—II of FIG. 1.

Referring to FIGS. 1 and 2, there is shown a desulfurization tower according to the invention. In the following examples, an absorption tower is a desulfurization tower. Gas is discharged from a boiler. The certain components of the waste gas which should be absorbed are sulfur oxides such as sulfur dioxide.

As shown in FIG. 1, the desulfurization tower, generally indicated by numeral 40, takes the form of a cylindrical tower. The tower has its lower portion rigidly fixed to foundations by support legs 41. A primary desulfurization section, or primary absorption section, 50 is formed in a lower part of the tower 40. A secondary desulfurization section, or secondary absorption section, 60 is formed above the primary section 50. An eliminator 26 is located above the secondary desulfurization section 60. A waste gas exit port 27 is formed on the top of the tower.

As shown also in FIG. 2, an inner cylinder 51 having a circular cross section is disposed coaxially with the body 40 of the tower in the primary desulfurization section 50. The cylinder 51 has a certain height. The upper end of the wall of the cylinder 51 is fixedly mounted to the inner wall of the body 40 of the tower by a partition member 51a that assumes the form of an inverted truncated cone. The cylinder 51 has a closed lower portion 51b which forms a vessel 51c receiving (holding) absorbent. The top of the inner cylinder 51 is open and in communication with the secondary desulfurization section 60. Flue gas passages 52 which have a certain height and a circular cross section are formed between the inner cylinder 51 and the wall surface of the tower body 40. A waste gas introduction port 53 is formed in the side wall of the tower body 40 and faces the passages 52. A waste gas introduction duct 54 is connected with the introduction port 53.

As shown in FIG. 2, the flue gas introduction port 53 bifurcates into the annular passages 52 which surround the inner cylinder 51. A flue gas inlet port 55 for flue gas which passed through the annular passages 52 and underwent primary desulfurization, or absorption, is formed in the side wall of the inner cylinder 51 at a higher position. The inlet port 55 is located opposite to the waste gas introduction port 53 at a certain distance from the port 53. The annular passages 52 both terminate in the inlet port 55 which has a certain height and a certain width. As shown in the plan view of FIG. 2, a number of sets of absorbent spraying nozzles 12 are spaced from each other along the flow of gas. In the present specific example, 3 sets of nozzles 12 are mounted in each passage 52. As shown in FIG. 1, each set of nozzles 12 consists of plural nozzles disposed at different heights. In the present specific example, each set of nozzles 12 consists of 5 nozzles located at different heights. These nozzles 12 are mounted so as to face the flow of flue gas. A vessel 57 for holding the absorbent is formed between the lower part 51b of the inner cylinder 51 and the bottom of the tower body 40. A pipe 14 is connected to the bottom of the vessel 57. A pipe 16 is connected with the pipe 14 via a pump 15 and divided into the nozzles 12. A make-up liquid supply tube 62 is connected in the pipe 14 on the suction side of the pump 15. An exit port 17 for discharging used absorbing liquid is connected with the pipe 16.

A packed bed 25 composed of resin particles and provided with a number of nozzles 31 for spraying the absorbent are mounted in the secondary desulfurization section 60 that is placed above the primary desulfurization section 50. The nozzles 31 are arranged across the upper surface of the packed bed 25. The nozzles 31 are connected with a vessel 51c by a pipe 30, a pump 29, and a pipe 28, the vessel 51 being mounted at the bottom of the inner cylinder 51. A make-up liquid supply tube 32 is mounted in the pipe 28 on the suction side of the pump 29.

The operation of the desulfurization tower constructed as described above is now described. Flue gas from the boiler has a temperature of 140° C. to 150° C. and contains about 1000 ppm of sulfur dioxide (SO$_2$). The gas is introduced into the primary desulfurization section 50 from the flue gas introduction duct 54 through the flue gas introduction port 53. Then, as shown in FIG. 2, the gas is divided into two streams around the inner cylinder 51 by the action of this cylinder and sent into the gas inlet port 55 which is formed in the upper wall portion of the cylinder 51 on the opposite side of the introduction port 53. Meanwhile, an absorbing liquid is sprayed against the streams of the flue gas from the numerous nozzles 12 in the annular passages 52 by the action of the pump 29. The absorbing liquid is a mixture water solution of the aforementioned composition. Sulfur dioxide (SO$_2$) contained in the flue gas is absorbed up to about 150 ppm, for example. Also, dust such as fly ashes is removed from the flue gas, and the gas is cooled to approximately 60° C. The absorbing liquid (absorbent) falls into the vessel 57, where it is kept at a certain level. A liquid level meter (not shown) is installed in the vessel 57 to detect the level of the liquid in the vessel 57. The used absorbing liquid is discharged from the exit tube 17 to maintain the detected level constant. It is possible that the annular passages 52 have desired width, height, and circumferential length, and, therefore, a sufficient volume is secured. Since the gas admitted into the desulfurization tower 40 is divided into two by the annular passages 52, if a large amount of flue gas is treated, the flow rate of the gas in the primary desulfurization section 50 can be lowered. A certain flow rate of gas (the actual rate is 15 to 20 m/sec., for example) needed to achieve a desired efficiency of desulfurization (absorption) can be attained. In this way, desulfurization can be performed at a given efficiency according to the flow rate of gas processed. Because the flow rate of gas inside the gas passages 52 can be reduced, the pressure loss in the primary desulfurization section 50 can be suppressed. Particles of mist of the absorbing liquid sprayed in the gas passages 52 are separated in these passages and can be easily sent back into the vessel 57. Consequently, the amount of mist entrained to the secondary desulfurization section 60 can be reduced.

After the primary desulfurization is completed in the two annular passages 52, the two streams of the flue gas meet at the gas inlet port 55. Then, the gas enters the inner cylinder 51, flows upward in the cylinder 51, and passes across the partition member 51a. The gas is admitted into the upper secondary desulfurization section 60 and introduced into packed bed 25. In the secondary desulfurization section 60, gas is sent upward from inside the inner cylinder 51 located in the center of the tower body 40 and so the gas flows substantially uniformly over the cross section of the tower. It is not necessary to distribute or homogenize the gas by providing plural chimneys 24, 24b as in the prior art apparatus. Inside the packed bed 25, the gas is brought into efficient contact with the mixture water solution of the aforementioned constitution. The solution is sprayed from the nozzles 31 mounted above the packed bed 25, by the action of the pump 29. In this way, the final desulfurization is effected. When the gas passes through the packed bed 25, the sulfur dioxide (SO$_2$) in the flue gas is absorbed up to about 40 ppm, for example. Subsequently, the gas passes through the eliminator 26, where mist is removed. Then, the gas is expelled from the uppermost flue gas exit port 27. The absorbing liquid dropping from the packed bed 25 enters the inner cylinder 51 while guided by the partition member 51a that takes the form of an inverted truncated cone, i.e., the diameter of the partition member increases upward. Then, the liquid stays in the vessel 51c which is located at the bottom of the cylinder 51.

In the present example, the vessel 51c is formed at the bottom of the inside of the cylinder 51 and so it is not necessary to mount the separate vessel 23 in the tower as in the prior art equipment. The height of the tower can be reduced accordingly. Since some of the liquid stored in the vessel 51c overflows through the gas inlet port 55 and flows down into the vessel 57, the level of the liquid is kept constant. The absorbing liquid in the vessel 51c is sent back to the nozzles 31 via the pipe 28, the pump 29, and the pipe 30 to reuse the liquid. Magnesium hydroxide (Mg(OH)$_2$) is adequately supplied from the pipes 32 and 62. The absorbing liquid used in the primary desulfurization section 50 and in the secondary desulfurization section 60 is a mixture water solution consisting of MgSO$_3$, Mg(HSO$_3$)$_2$, MgSO$_4$, and H$_2$O, in the same way as the foregoing. SO$_2$ is absorbed chiefly by MgSO$_3$. Desulfurization, or absorption, is performed by the following reactions:

$$Mg(OH)_2 \text{ (make-up liquid)} + SO_2 + H_2O \rightarrow MgSO_3 + H_2O$$

$MgSO_3 + SO_2 + H_2O \rightarrow Mg(HSO_3)_2$ $MgSO_3 + \frac{1}{2}O_2 \rightarrow MgSO_4$ As an example, a mixture water solution having a concentration of 5% and a pH of 5.2 is used in the primary desulfurization section 50, while a mixture water solution having a concentration of 1% and a pH of 5.9 to 6.2 is employed in the secondary desulfurization section 60. A pH meter (not shown) is mounted in the pipe 16 located ahead of the nozzles 12 of the primary desulfurization section 50. Another pH meter (not shown) is installed in the pipe 30 which is positioned ahead of the nozzles 31 of the secondary desulfurization section 60. The opening of adjusting valves (not shown) mounted in the make-up liquid supply tubes 62 and 32 is controlled according to the pH values detected by the pH meters.

Since the desulfurization tower is built as described thus far, if the inside diameter is 8 m, the tower alone can treat a large amount of waste gas as described above, for example 350,000 Nm$^3$/hr.

Figure 3:
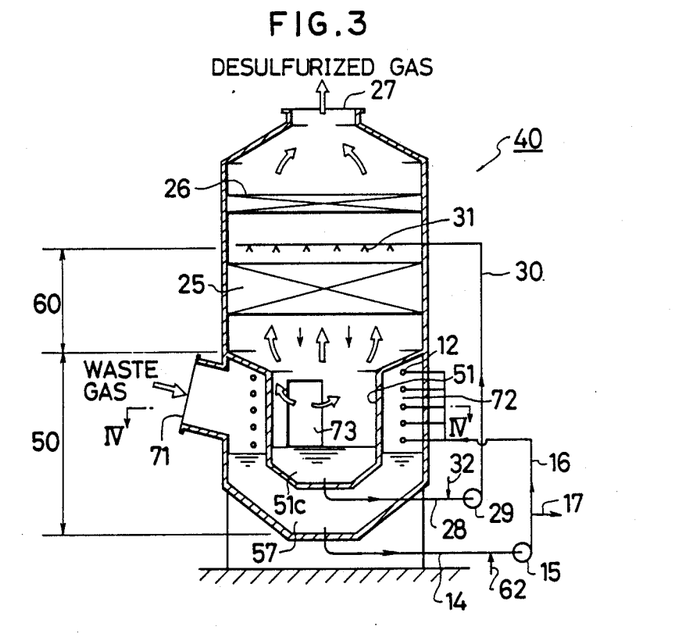
FIG. 3 is a vertical cross section of another desulfurization tower according to the invention.
Figure 4:
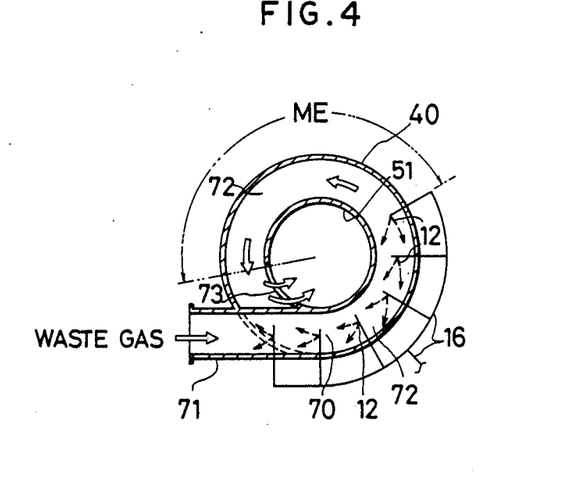
FIG. 4 is a plan view in cross section taken along line IV—IV of FIG. 3.

Referring next to FIGS. 3 and 4, there is shown another desulfurization tower according to the invention. It is to be noted that like components are indicated by like reference numerals, and that those parts which have been already described in connection with FIG. 1 and 2 will not be described below.

As shown in FIG. 4, the primary desulfurization section 50 has a gas passage 72 which is shaped into a single annular passage. A gas introduction port 70 is so formed that it extends tangent to the annular passage 72. A gas inlet port 73 that is in communication with the secondary desulfurization section 60 is formed in the side wall of the inner cylinder 51 at the same height as the gas introduction port 70.

More specifically, as shown in FIG. 4, the gas inlet port 73 is formed at the boundary between the side wall of the inside of the gas introduction duct 71 and the side wall of the inner cylinder 51. The side wall of the inside of the duct 71 is coupled to the side wall of the cylinder 51 and to the wall surface of the tower body at a position located under the level of the absorbing liquid in the vessel 57. Therefore, the gas introduced from the duct 71 is completely separated from the gas admitted from the inlet port 73 communicating with the secondary desulfurization section 60, i.e., both kinds of gas are prevented from mixing. The absorbent spraying nozzles 12 are regularly spaced from each other and located within a given region which is closer to the gas introduction port 70 inside the gas passage 72.

Since the gas passage 72 is formed in the primary desulfurization section 50 in this way, a longer gas passage is obtained, and the gas flows through only one passage. For this reason, the gas makes contact with the absorbent more frequently, thus improving the efficiency at which the gas is absorbed. As shown in FIG. 4, a mist removal region ME is formed by the gas passage 72 between the nozzle 12 located at the most downstream position in the direction of gas flow and the gas inlet port 73. Consequently, mist is removed well in the primary desulfurization section 50. This can reduce the amount of mist entrained to the secondary desulfurization section 60.

Figure 5:
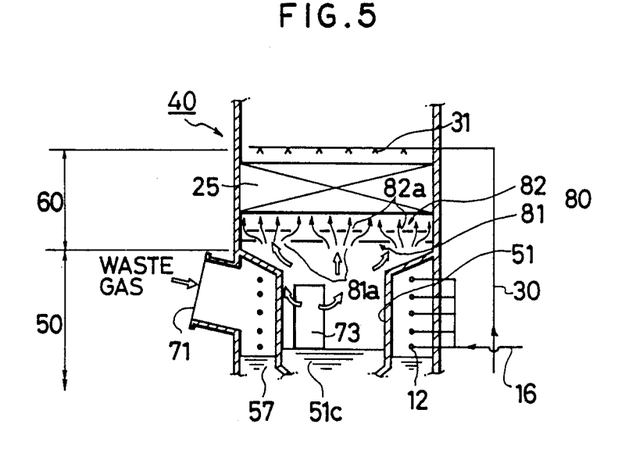
FIG. 5 is a vertical cross section of main portions of a further desulfurization tower according to the invention, the tower being equipped with a gas dispersion device.

A gas dispersion apparatus 80 shown in FIG. 5 can be added to any of the above-described absorption towers. The apparatus 80 disperses the gas introduced into the secondary desulfurization section 60 after it goes upward out of the inner cylinder 51. The apparatus 80 is mounted in the space between the upper end of the cylinder 51 and the packed bed 25. The gas dispersion apparatus 80 comprises lower plates 81 and upper plates 82. Each lower plate 81 is provided with a given number of gas passage holes 81a which are uniformly spaced from each other. Each upper plate 82 is provided with a given number of gas passage holes 82a which are uniformly spaced from each other. The upper plates 82 are located above the gas passage holes 81a. The gas dischaged from the inner cylinder 51 is distributed to the gas passage holes 81a in the lower plates 81, flows upward, and passes through the numerous gas passage holes 82a in the upper plates 82 and between the successive upper plates 82. As a result, the gas is dispersed uniformly over the whole cross section, and the gas is uniformly supplied to the packed bed 25 of the upper secondary desulfurization section 60. Hence, secondary desulfurization, or absorption, is effected efficiently in the packed bed 25. The absorbing liquid falling from the secondary desulfurization section 60 passes through the gas passage holes 82a, 81a, etc. in the gas dispersion apparatus 80, drops into the inner cylinder 51, and remains in the vessel 51c. Also in this case, the absorption liquid-holding vessel 23 (FIG. 6) of the prior art apparatus is dispensed with. The height of the absorption tower can be reduced accordingly. This enables the tower to be made smaller in size.

In the description made thus far, the gas absorption tower is a desulfurization tower which absorbs sulfur oxides of flue gas emitted from a boiler as certain components. Of course, the invention is applicable to a general absorption tower that absorbs certain components of other kind of gas.

As can be seen from the description made thus far, the novel gas absorption tower can provide a small-sized gas absorption tower. Accordingly, where a large amount of gas is treated, only small space is needed to install the gas absorption tower, and it is easy to install it. The gas passage capable of securing a sufficient volume between the inner cylinder and the body of the tower can be formed in the primary absorption section. Therefore, a certain flow rate of gas needed to absorb certain components of the gas can be realized. This assures the absorption.

In another feature of the invention, the gas passage bifurcates at the position at which the gas introduction port is mounted. The gas inlet port is formed in the side wall of the inner cylinder on the opposite side of the gas introduction port. The divided gas passages meet at the gas inlet port. Since the gas passage is divided into two, the flow rate of gas in the primary absorption section can be reduced to thereby reduce the pressure loss. Also, mist can be easily separated from the gas. Consequently, the amount of mist entrained to the secondary absorption section can be reduced.

In a further feature of the invention, the gas introduction port extends tangent to the gas passage. The gas inlet port is formed in the side wall of the inner cylinder on the same side as the gas introduction port. This permits the gas passage in the primary absorption section to be lengthened. The result is that the gas makes contact with the absorbing liquid more frequently, thus enhancing the efficiency at which the gas is absorbed. Since a length of mist removal region can be effectively secured, the amount of mist entrained to the secondary absorption portion can be reduced.

What is claimed is:

1. A gas absorption tower for absorbing one or more certain components of a gas, said tower comprising:
   a primary absorption section which absorbs the certain components and is mounted in the tower, the primary absorption section being located at a lower position in the tower; and
   a secondary absorption section which absorbs the certain components and is mounted in the tower, the secondary absorption section being located at a higher position in the tower;
   said primary absorption section comprising;
      an inner cylinder whose top is connected with the secondary absorption section, the cylinder having a closed lower portion to form a vessel that holds absorbent dropping from the secondary absorption section;
      a gas passage formed between the inner cylinder and the wall surface of the tower;
      a gas introduction port that opens into the gas passage;
      a gas inlet port formed in the side wall of the inner cylinder so as to open into the cylinder, the gas inlet port being connected with the gas passage at a certain distance from the gas introduction port along the gas passage; and
      nozzles for spraying an absorbing liquid, the nozzles being disposed along the flow of gas in the gas passage extending to the gas inlet port opening into the inner cylinder.

2. The gas absorption tower of claim 1, wherein the gas passage bifurcates at the position at which the gas introduction port is mounted, the gas inlet port being formed in the side wall of the inner cylinder on the opposite side of the gas introduction port, and wherein the divided gas passages meet at the gas inlet port.

3. The gas absorption tower of claim 1, wherein the gas introduction port extends tangent to the gas passage, and wherein the gas inlet port is formed in the side wall of the inner cylinder on the same side as the gas introduction port.

* * * * *